United States Patent Office 3,379,934
Patented Apr. 23, 1968

3,379,934
ELECTRICAL PROTECTIVE RELAYS
Hans Hoel, Oslo, Norway, and William Derek Humpage, Glossop, England, assignors to The English Electric Company Limited, London, England, a British company
Filed Apr. 26, 1965, Ser. No. 450,606
Claims priority, application Great Britain, Apr. 29, 1964, 17,653/64
5 Claims. (Cl. 317—36)

ABSTRACT OF THE DISCLOSURE

This invention relates to an electrical protective relay designed to combine in a simple manner a number of preselected vector quantities in different ways so as to produce a wide variety of operating characteristics defining any number of desired shapes. The relay employs a first comparator for comparing two input signals of a specified type and operable in response thereto to actuate a protective device after a predetermined time delay (the response characteristic being a mho circle), a second comparator for comparing two other input signals and a third comparator for comparing outputs from the first and second comparators and itself actuating a protective device in response to a certain relationship between its compared signals. The response characteristic resulting from actuation by the third comparator is a modified mho circle and further modification to the response characteristics is effected by modifying the input signal to the second comparator after another time delay.

---

The invention relates to electrical protective relays.

The present invention consists in a protective relay for an electrical system, comprising first and second comparators each of which is adapted to compare at least two input signals which are proportional to different vectorial quantities representative of electrical conditions in said system, the first and second comparators being operative to produce first and second intermediate signals dependent on the instantaneous phase relationship of their input signals and the first comparator additionally being operative to produce an output signal in response to a predetermined phase relationship existing between its input signals indicative of a fault having occurred in said system, a third comparator for comparing the intermediate signals and operative to produce an output signal in response to a predetermined phase relationship existing between these signals indicative of a fault having occurred in said system, and control means for effecting protective action in response to the presence of either output signal.

The relay may additionally comprise a first time delay circuit connected between the control means and the first comparator for delaying the output signal therefrom for a period T2, the arrangement being such that the presence of an output signal from the third comparator is indicative of a fault having occurred within one zone of protection embraced by the relay and the presence of the delayed output signal from the first comparator is indicative of a fault having occurred within another, greater, zone of protection embraced by the relay.

Furthermore, the relay may comprise a second time delay circuit connected to the first comparator and operative to delay the output signal therefrom, for a period T1 less than that effected by the first delay circuit, the delayed output signal from the second time delay circuit being operative to modify at least one of the input signals to the second comparator whereby the presence of an output signal from the third comparator during the interval between T2 and T1 is indicative of a fault having occurred within a zone of protection greater than said one zone but less than the other zone.

Thus, this invention affords a simple and inexpensive manner of comparing and combining a number of preselected vector quantities in a number of different ways to produce a wide variety of operating characteristics.

An electrical protective relay according to the present invention will now be described by way of example and with reference to the accompanying drawings in which.

Figure 1:
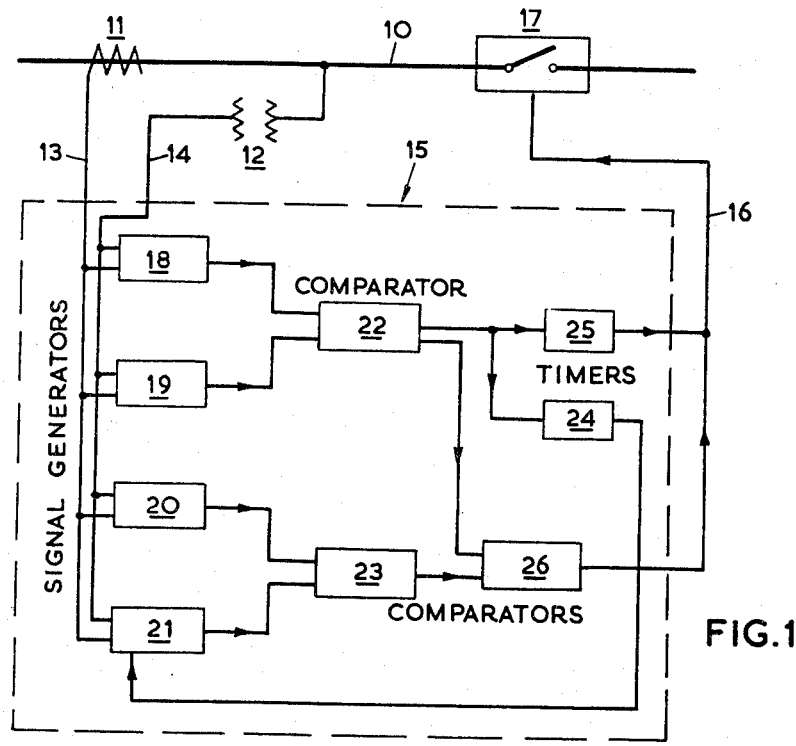
FIG. 1 shows schematically the arrangement and circuit of the relay.

An electrical power-line 10 is connected through current transformer 11 and voltage transformer 12 to input circuits 13 and 14 respectively for supplying to a relay 15 signals dependant on the current and the voltage in the power-line 10. A relay output circuit 16 conveys tripping signals from the relay 15 to a circuit-breaker 17 in the power-line 10.

Signal generators 18 to 21 energised by signals from input circuits 13 and 14 supply input signals S1 to S4, respectively for phase angle comparators 22 and 23 arranged to receive and to phase-compare these input signals. The phase comparator 22 is arranged to produce an output signal for timers 24 and 25 whenever the phase-angle between its input signals is less than 90°; that is, for example, whenever the respective input signals to the phase comparator have the same sense simultaneously for a period of time greater than one-quarter of the time period of the alternating current supply to the power system, whereas phase comparator 23 is merely a coincidence detector, i.e., it operates in the manner of an AND gate.

In particular, the comparator 22 is of the general form of the comparators illustrated and described in co-pending patent application No. 450,699 filed Apr. 26, 1965 by W. D. Humpage et al. and assigned to the same assignee, that is, it comprises an AND circuit, for producing an intermediate signal, followed by a time-delay device which feeds one input of a further AND circuit, the other input being connected to receive the intermediate signal. As mentioned in the above application, the time delay device delays the intermediate signal by a predetermined period so that it is effective, together with the said further AND circuit, to "test the width" of the intermediate signal, the time delay introduced by this device thereby governing the actual phase angles detected by the comparator.

The timer 24 is arranged to produce a signal for the signal generator 21 after a time delay $T_1$ in response to an output signal of the comparator 22, this signal being operative to modify the output from the signal generator 21. In addition, a timer 25 is arranged to produce a tripping signal for the circuit-breaker 17 after a longer time interval $T_2$ in response to the output signal from the comparator 22. As mentioned above, the phase comparator 22 produces an intermediate signal dependent on the phase relationship of its input signals and this intermediate signal is applied to a phase comparator 26 together with the output from the comparator 23. The comparator 26 is essentially constructed in the same manner as comparator 22 and produces a tripping signal for the circuit-breaker 17 whenever its input signals from comparators 22 and 23 have the same sense simultaneously for a duration greater than or equal to one-quarter of the time period of the alternating current supply to the power system.

Figure 2:
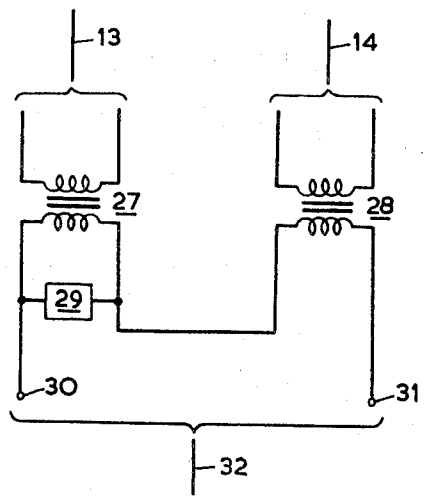
FIG. 2 shows the circuit of a signal generator incorporated in the relay.

Referring to FIG. 2 the signal generator circuit is shown in more detail. In particular, primary windings of transformers 27 and 28 are connected respectively to input circuits 13 and 14. The secondary winding of the transformer 27, having an impedance 29 in parallel, is connected in series with the secondary winding of transformer 28 across terminals 30 and 31. A circuit 32 feeds the signal at terminals 30 and 31 to the appropriate comparators. If V and I are the voltage and the current in the power-line and Z is the value of the impedance 29, then the signal on line 32 is a voltage vector $(AV-BIZ)$ where A and B are constants which may have any value (excepting that A and B cannot be zero simultaneously). The values of A and B may be adjusted by alteration of the number of turns in the windings of transformers 27 and 29 and the polarity of their connection to input circuits 13 and 14. The impedance value of the impedance 29 is also preselected to be some desired value to give desired relay operating characteristics, for example W, X and Y as shown in FIG. 3.

Figure 3:
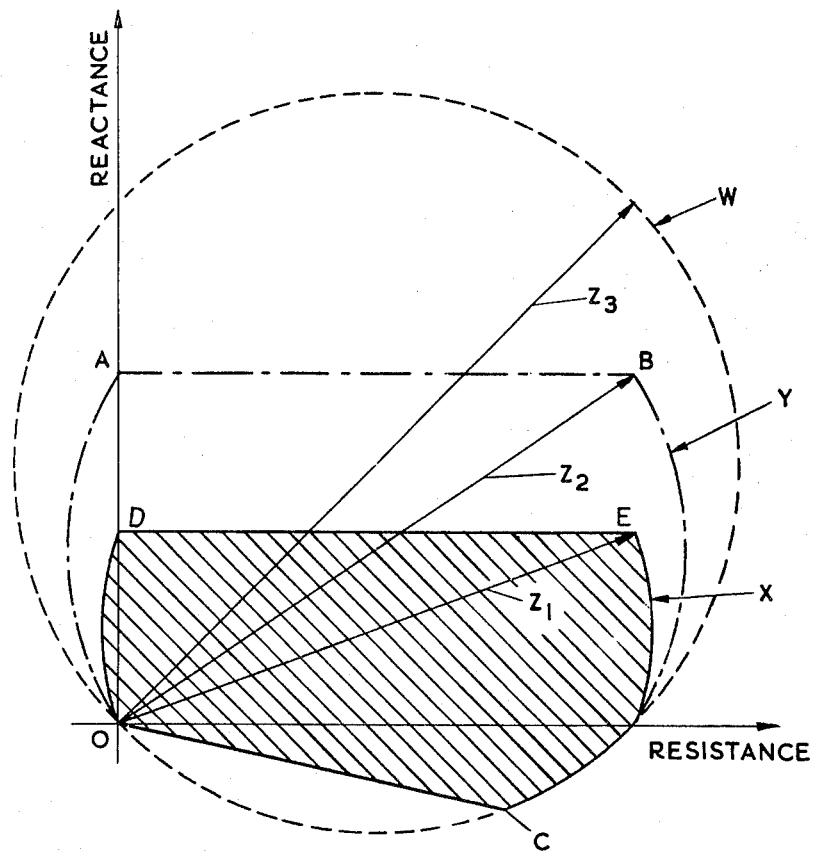
FIG. 3 is an impedance diagram showing operating characteristics of the relay.

In FIG. 3, the circle W is the starting characteristic and a ZONE THREE operating characteristic of the relay. Similarly, characteristics X and Y are respectively a ZONE ONE and ZONE TWO operating characteristic of the relay. The circle characteristic W (directional mho) is formed by comparing input signals $S_1$ and $S_2$, as mentioned above, and producing an output signal from comparator 22 whenever the phase angle between these signals is greater than 90°. The characteristic Y is a composite characteristic a portion of which is bounded by the directional mho characteristic W and includes a circular characteristic derived from signals S1 and the modified signal S4, and limiting portions AB and OC which are derived from signals S3, S4 (modified) and S1, S3, respectively, this characteristic Y being dependent on signals applied to comparator 26 which produces an output whenever the phase angle between the intermediate signal and the output from comparator 23 is greater than 90°. Finally, the characteristic X is another composite characteristic similar to characteristic Y but in this instance the circular characteristic and the limiting portion DE, which are derived from S1, S4 and S3, S4, respectively, are different quantities since S4 is now unmodified, an output again being produced from the comparator 26 whenever the phase angle between the intermediate signal and the output from comparator 23 is greater than 90°.

In operation, the signal generators produce output signals respectively dependent on the voltage vectors as follows:

($S_1$) Signal generator 18 V ($S_2$) Signal generator 19

$$-V+IZ_3 \lfloor \theta_3 - \phi_L$$

($S_3$) Signal generator 20

$$IZ_2 \lfloor \theta_2 - \phi_L$$

($S_4$) Signal generator 21

$$-V \lfloor \alpha_1 + IZ_1 \lfloor \theta_1 - \phi_L$$

where $\alpha_1 = -10°$, $\theta_1 = 10°$, $\theta_2 = 80°$, $\theta_3 = 45°$ and $\phi$ is the phase angle between V and I.

The voltage of the electrical system is used as a reference vector. Thus $$Z_1 \lfloor 80°$$

represents an impedance vector of magnitude $Z_1$ at 80° phase angle "leading" the reference vector. In the same way, $$-V \lfloor -10$$

represents a voltage vector of magnitude $-V$ and $-10°$ phase angle lagging the reference vector.

With these values, the modified signal produced by the signal generator 21 on receipt of a signal from the timer 25 then becomes dependent on $-KV \lfloor -10 + IZ_2 \lfloor 10 - \phi_L$, where K is a constant affecting the ratio between these two terms.

If the effective impedance of the power-line lies within the characteristic of the ZONE ONE the intermediate signals from the comparator 22 and the output from comparator 23 will have the same sense simultaneously for a time period such that the comparator 26 initiates the sending of a tripping signal to the circuit-breaker without delay.

Whenever an output signal is produced by the comparator 22 to the timers 24 and 25, each timer is energised to start its respective timing operation. Thus, after the time delay $T_1$ a signal is provided at signal generator 21 to alter $Z_1$ to $Z_2$ so that whenever the effective impedance lies within the ZONE TWO but not in the ZONE ONE a tripping signal is provided after a time interval substantially equal to $T_1$.

Subsequently, after the longer time interval $T_2$, a tripping signal is produced by the timer 25 for the circuit-breaker 17 so that a tripping signal is produced whenever the effective impedance of the power-line is within the ZONE THREE of the relay.

In a modification, a waveform modifying means may be arranged to modify the intermediate signal from the comparator 22 to the comparator 26 in order to influence the operating characteristic of the ZONE ONE and the ZONE TWO of the example described above, the ZONE THREE remaining unchanged.

It will be appreciated that the comparators may be symmetrical phase angle comparators or, asymmetrical phase angle comparators and the phase angles or amplitudes to which such comparators respond may be arranged as desired to provide the relay with any desired overall operating characteristic.

It will be appreciated that comparators 22 and 23 may receive more than two input signals and it will be further appreciated that in the general case where there are $n$ comparators, $(n-1)$ intermediate signals may be connected into any, or all, of the $n$ comparators. In this way more complex relay operating characteristics may be produced.

What we claim as our invention and desire to secure by Letters Patent is:

1. A protective relay for an electrical system, comprising
   circuit means for producing signals proportional to different vectorial quantities representative of electrical conditions in said system,
   a first comparator for comparing at least two of said signals and operative to produce a first intermediate signal dependent on the instantaneous phase relationship of these signals and to produce an output signal in response to a predetermined phase relationship existing between these signals indicative of a fault having occurred in the system,
   a second comparator for comparing at least two of said signals from the circuit means and operative to produce a second intermediate signal dependent on the phase relationship of these signals,
   a third comparator for comparing the intermediate signals and operative to produce an output signal in response to a predetermined phase relationship existing between these signals indicative of a fault having occurred in said system, and
   control means for effecting protective action in response to the presence of either one of the output signals.

2. A protective relay according to claim 1, comprising a first time delay circuit connected between the control means and the first comparator for delaying the output signal therefrom for a period $T_2$, the presence of an output signal from the third comparator being indicative of a fault having occurred within one zone of protection embraced by the relay and the presence of the delayed output signal being indicative of a fault having occurred within another, greater, zone of protection embraced by the relay.

3. A protective relay according to claim 2, comprising a second time delay circuit connected between the first comparator and the input means associated with the second comparator and operative to delay the output signal from the first comparator for a period $T_1$ less than that effected by the first delay circuit, the delayed output signal from the second time delay circuit being operative to modify the signals compared by the second comparator whereby the presence of an output signal from the third comparator during the interval between $T_2$ and $T_1$ is indicative of a fault having occurred within a zone of protection greater than said one zone but less than the other zone.

4. A protective relay according to claim 3, wherein at least one of the comparators is a phase angle comparator.

5. A protective relay according to claim 3, wherein at least one of the comparators is an asymmetrical phase angle comparator.

References Cited
UNITED STATES PATENTS

| | | | |
|---|---|---|---|
| 2,912,622 | 11/1959 | Warrington | 317—36 X |
| 3,178,616 | 4/1965 | Blackburn et al. | 317—36 X |
| 3,192,442 | 6/1965 | Warrington et al. | 317—36 |
| 3,201,651 | 8/1965 | Calhoun | 317—36 |

MILTON O. HIRSHFIELD, *Primary Examiner.*

J. D. TRAMMELL, *Assistant Examiner.*